Jan. 14, 1930.

F. L. ALBEN 1,743,093

JOURNAL BEARING

Filed May 12, 1927

WITNESSES:
E. A. M'Closkey.
Birney Hines

INVENTOR
Frank L. Alben.

BY
Wesley G. Carr
ATTORNEY

Patented Jan. 14, 1930

1,743,093

UNITED STATES PATENT OFFICE

FRANK L. ALBEN, OF PITTSBURGH, PENNSYLVANIA, ASSIGNOR TO WESTINGHOUSE ELECTRIC & MANUFACTURING COMPANY, A CORPORATION OF PENNSYLVANIA

JOURNAL BEARING

Application filed May 12, 1927. Serial No. 190,681.

My invention relates to journal bearings, and more particularly to end thrust bearings and lubricating means for such bearings.

In general, the journal box bearings heretofore used in railway vehicles have comprised a casing, a saddle bearing mounted in the casing and a journal rotatably mounted in the saddle bearing. The end thrust of the journal was taken care of by providing a shoulder on the journal disposed to bear against a rounded end portion of the saddle bearing, and also by designing the saddle bearing so that its inner end bears against the hub of the wheel which is secured to the axle that carries the journal. Usually, renewable liners were placed upon the hub to keep the saddle bearing from wearing the hub excessively. The lubrication of the bearings was usually accomplished by the well-known method of packing them with oil-soaked waste.

The object of the invention, generally stated, is the provision of a journal bearing comprising means for taking care of the end thrust of the journal and means for lubricating the bearing that shall be simple and efficient in operation and capable of being readily and economically manufactured.

Another object of the invention is to facilitate the adjustment and replacement of end thrust bearings by mounting them in the outer end of the journal box at the ends of the journal.

A further object of the invention is to provide for the lubrication of journal bearings by a removable mechanical means.

It is also an object of the invention to provide a journal bearing in which the saddle bearing for the journal may be easily replaced.

Other objects of the invention will, in part, be obvious and will, in part, appear hereinafter.

The invention is disclosed in the embodiment thereof shown in the accompanying drawing and comprises the structural features and the combination of elements and arrangement of parts which will be exemplified in the construction hereinafter set forth, and the scope of the application of which will be indicated in the appended claims.

Figure 1:
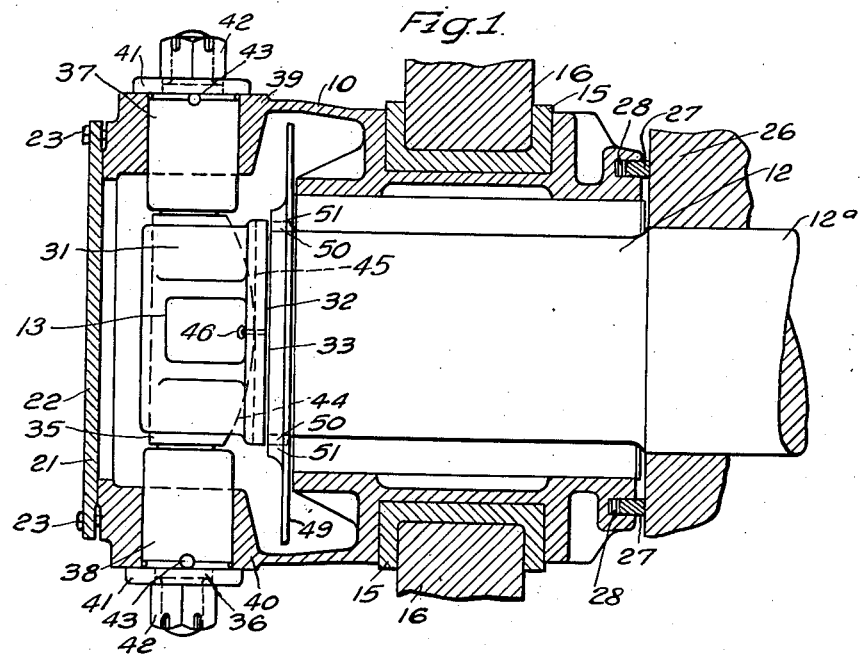
Figure 2:
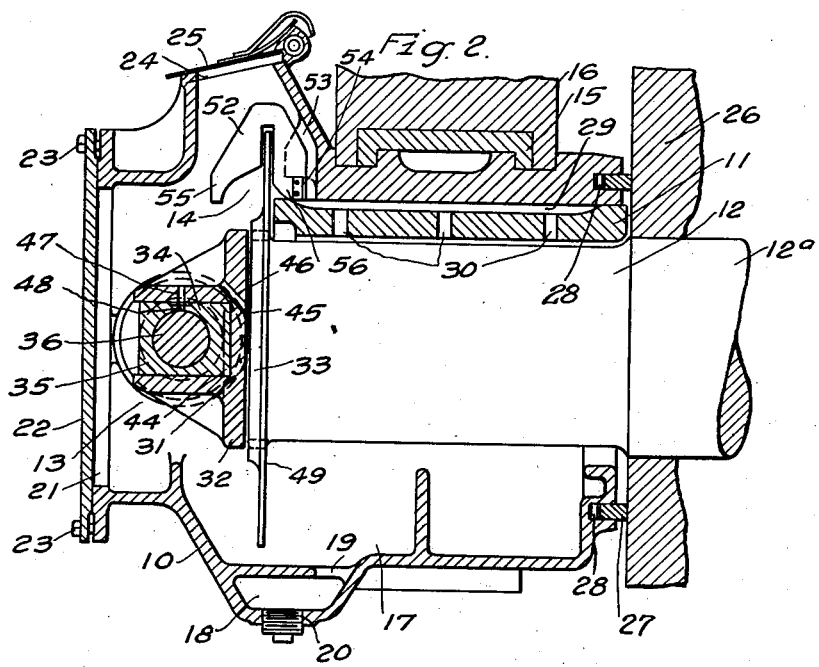

For a fuller understanding of the invention, reference may be had to the following detailed description, taken in connection with the accompanying drawing in which:

Figure 1 is a view, partly in section and partly in plan elevation, of a journal bearing embodying the invention, and Fig. 2 is a vertical, longitudinal view, in section, of the journal bearing illustrated in Fig. 1.

The drawing illustrates a journal bearing comprising, in general, a journal casing 10, a saddle bearing 11, a journal 12 seated in the saddle 11, an end thrust bearing 13 adapted to take up the end thrust of the journal 12, and a lubricating device 14 for lubricating the saddle bearing and the end thrust bearing.

The journal casing 10 is mounted upon shoes 15 in a frame 16, and is provided with a lubricating well 17 in its lower portion for holding a supply of lubricant. A drainage well 18, for collecting sediment and through which the lubricating well may be drained, is located in the lower part of the casing 10 and under the lubricant-containing well 17, with which it is connected by an opening 19. The drainage well may be cleaned through an opening 20 in its bottom portion.

The outer end of the casing 10 is provided with a large opening or doorway 21 that is covered by a lid 22 which is removably secured to the casing by means of stud bolts 23. The casing 10 is also provided with an opening 24, in its outer top portion through which the interior of the casing may be inspected and also through which the device for lubricating the bearings may be removed. A hinged lid 25 is provided for covering the opening 24. The journal 12 is formed upon axle $12^a$ which is supported by a car wheel, only a part of the hub portion 26 of which is illustrated.

A lubricant-retaining ring 27 is shown as located in a groove in the end of the casing 10 adjacent to the wheel hub 26 and a spring 28 is positioned in the bottom of the groove and is adapted to press the ring 27 against the hub 26 and thereby form a seal to prevent lubricant from escaping from the bearing.

The saddle bearing 11 is similar to those usually employed in journal box bearings except that it is provided with a longitudinal lubricating duct 29 and a plurality of short lubricating ducts 30 leading from the duct 29 to the inner face of the saddle bearing. The lubricating ducts 29 and 30 are adapted to cooperate with the lubricating device 14 in a manner to be hereinafter described.

The end-thrust bearing 13 comprises a bearing shoe 31 provided with a bearing surface 32 that is disposed to receive the outer end 33 of the journal 12. The rear part of the bearing shoe 31 is provided with a box-like recess 34 adapted to receive a supporting block 35 that is mounted on a bolt 36.

As shown, eccentric sleeves 37 and 38 are provided on the bolt 36 and these sleeves are utilized for mounting it in position in the side walls 39 and 40 of the journal casing 10.

Each of the eccentric sleeves 37 and 38 is provided on its outer end with a collar 41 that fits against the walls of the casing and limits the inward movement of the sleeves. Each end of the bolt 36 is provided with a nut 42 by means of which the eccentric sleeves 37 and 38 may be retained in position.

It is desirable to keep the eccentric sleeves 37 and 38 from rotating after the end-thrust bearing has been adjusted to its proper position, and therefore dowel pins 43 are provided. As illustrated, the inner ends of the dowel pins engage in holes in the eccentric sleeves and the other ends fit into slots cut in the edge of the walls of the opening in the casing 10 adjacent the collar end of the sleeves, so that when the eccentric sleeves are forced into their innermost positions by means of the nuts 42 on the bolt 36 the outer ends of the pins will enter the slots and hold the eccentric sleeves in any predetermined position.

The block 35 is mounted upon the bolt 36 so that it may rotate thereon and the portion of the block that fits into the recess 34 is provided with a convex face 44 that is adapted to bear against a flat bottom 45 of the recess 34 in the bearing shoe 31. Inasmuch as the block 35 that is located in the recess 34 of the end thrust shoe 31 is free to rotate on the bolt 36 and by reason of its longitudinal convex surface bearing against the flat bottom 45 of the recess 34, the bearing shoe 31 is free to pivot about a point on the axis of the bolt 36 and consequently, is free to follow the movements of the end of the journal 12.

The bearing shoe 31 is provided with a lubricating duct 46 leading from its upper surface to that portion of it that bears against the end of the journal, and it is also provided with a lubricating duct 47 leading from its upper surface to a cooperating duct 48 in the block 35 for lubricating the joint between the block 35 and the bolt 36.

The means for conveying the lubricant from the lubricating well to the saddle bearing and the end thrust bearing comprises a disk 49 that is removably mounted upon the outer end of the journal 12 but which is caused to rotate with the journal 12 by lugs 50 provided on the journal and which engage in recesses 51 in the inner periphery of the disk 49. An inverted U-shaped scraper 52 is placed astride the upper part of the disk 49, and is held in its upright position by a pair of lugs 53 on the interior of the casing 10. A projecting member 54 is riveted to each side of the lubricant scraper 52 near the bottom of one of the lower portions thereof and serves to keep the lubricant scraper from moving upwardly after it is placed in position between the lugs 53.

The lubricant scraper 52 may be constructed of micarta or any other suitable material. In this embodiment, the scraper is provided with a pair of depending portions 55 and 56. As the lubricant accumulates on the scraper, the depending portion 55 conveys some of it by gravity to the end thrust bearing and the depending portion 56 conveys some of it by gravity to the lubricating ducts in the saddle bearing.

When it is desired to operate the bearing, a quantity of lubricant is introduced into the well 17. As the journal rotates in the bearing, the disk 49 rotates with it and passes through the lubricant in the well 17. Some of the lubricant will adhere to the disk and will flow toward its periphery under the influence of a centrifugal force and will then be collected by the scraper 52. A portion of the lubricant removed from the disk by the scraper will follow the depending portion 55 and drop from its lowermost point to the upper face of the bearing shoe 31 and from there will flown down through the lubricating ducts 46 and 47 and 48 to the wearing surfaces of the end thrust bearing and the block 35 on the bolt 36. Some of the lubricant removed from the disk by the other portion of the scraper will follow the depending part 56, and will drop into the main lubricating duct 29 in the saddle bearing 11 and from there flow into the lubricating ducts 30 and serve to lubricate the bearing surface between the journal 12 and the saddle bearing.

In order to effect an initial setting of the end thrust bearing or compensate for wear, the nuts 42 on the bolt 36 may be loosened to permit the eccentric sleeves 37 and 38 to be drawn outward, so that they may be rotated to adjust the thrust bearing to the proper position. When the bearing is set, the sleeves may be pushed back into place, and the dowel pins 43 will engage in the slots corresponding to the desired position of the sleeves.

When it is desired to replace the saddle bearing, the bolts 23 in the end cover are loosened and the end cover 22 is removed from the casing. The nuts 42 on the ends of the bolt 36 are then removed and the bolt is withdrawn from the casing, thus releasing the bearing shoe 31 with its supporting block 35 and permitting it to be taken out through the opening 21. After the end thrust bearing is removed, the lubricating disk 49 may be removed from the end of the journal 12 and with it the lubricating scraper 52, so that both may be lifted through the top opening 24 in the casing. As soon as the end thrust bearing and the lubricating device are taken out of the casing, it is a simple matter to force the journal box or casing upward, by the ordinary methods used in railroad practice, and then lift out the saddle bearing and replace it.

In supplying an adjustable and removable end thrust bearing for the journal, I have eliminated the necessity of providing liners on the outer face of the hub 24 to take up the wear that would occur by reason of the action of the saddle bearing upon the hub, and have also avoided the necessity of expensive replacement of such liners.

While the illustrated example constitutes a particular embodiment of my invention, I do not limit myself strictly to the details shown, since, manifestly, the same may be considerably varied without departing from the spirit of the invention as defined in the appended claims.

I claim as my invention:

1. In a journal bearing, the combination with a casing, eccentric sleeves mounted in the casing, a journal, and a saddle bearing for the journal, of an end thrust bearing comprising a bearing shoe disposed to bear against one end of the journal and a bolt having its end portions mounted in the eccentric sleeves and adapted to support the bearing shoe.

2. In a journal bearing, the combination with a casing having eccentric sleeves mounted therein, a journal, and a saddle bearing for the journal, of an end thrust bearing comprising a bearing shoe disposed to bear against one end of the journal, a bolt having its end portions mounted in the eccentric sleeves, and a block rotatably mounted on the bolt and adapted to support the bearing shoe.

3. In a journal bearing, the combination with a casing, a journal, and a saddle bearing for the journal, of an end thrurst bearing comprising a bearing shoe disposed to bear against one end of the journal, an adjustable eccentric sleeve mounted in the wall of the casing, a bolt mounted in the eccentric sleeve, and a block rotatably mounted on the bolt for supporting the bearing shoe.

4. An end thrust bearing comprising a casing, a plurality of eccentric sleeves adjustably mounted in the casing, a bolt journalled in the eccentric sleeves, a block rotatably mounted on the bolt and provided with a convex face portion, and a bearing shoe provided with a bearing surface on one side and having a flat bottomed recess in the other side adapted to receive the convex face portion of the block.

5. An end thrust bearing comprising a casing, a plurality of eccentric sleeves adjustably mounted in the casing, a bolt journalled in the eccentric sleeves, and a bearing shoe pivotally mounted on the bolt.

6. An end-thrust bearing comprising a casing, a bolt carried by the casing, a block rotatably mounted on the bolt and provided with a convex face portion, and a bearing shoe provided with a bearing surface on one side and having a flat bottomed recess in the other side for receiving the convex face portion of the block.

7. In a journal bearing, the combination with a casing, a journal disposed within the casing, and a radial bearing member carried by the casing for engaging the journal in the usual manner, of an end-thrust bearing shoe, said bearing shoe being provided on one side with a bearing surface for engaging the end of the journal and having a flat bottomed recess in the other side, a bolt carried by the casing and disposed at right angles to the journal, and a block rotatably mounted on the bolt for engaging the recess in the bearing shoe, said block being provided with a convex face portion for engaging the flat bottom of said recess.

8. An end-thrust bearing comprising a journal having a flat end, a casing for enclosing the journal, a bolt carried by the casing and having its axis disposed at right angles to the axis of the journal, a block rotatably mounted on the bolt and provided with a convex face portion, and a bearing shoe provided with a bearing surface on one side for engaging the end of the journal and having a flat bottomed recess in the other side for receiving the convex face portion of the block, whereby the bearing shoe is permitted to move in such manner as to follow the movements of the journal.

In testimony whereof, I have hereunto subscribed my name this 2nd day of May, 1927.

FRANK L. ALBEN.